US008575852B2

(12) United States Patent
Ger et al.

(10) Patent No.: US 8,575,852 B2
(45) Date of Patent: Nov. 5, 2013

(54) MULTI-LAMP DRIVING SYSTEM

(75) Inventors: Chih-Chan Ger, Jhongli (TW);
Yu-Hsiao Chao, Jhongli (TW);
Cheng-Ta Lin, Jhonhli (TW)

(73) Assignee: Ampower Technology Co., Ltd.,
Jhongli, Taoyuan County (TW)

( * ) Notice: Subject to any disclaimer, the term of this patent is extended or adjusted under 35 U.S.C. 154(b) by 279 days.

(21) Appl. No.: 13/167,739

(22) Filed: Jun. 24, 2011

(65) Prior Publication Data
US 2012/0256557 A1    Oct. 11, 2012

(30) Foreign Application Priority Data

Apr. 11, 2011    (CN) ...................... 2011 2 0105039 U

(51) Int. Cl.
*H05B 41/16*    (2006.01)
(52) U.S. Cl.
USPC ........... 315/256; 315/224; 315/255; 315/291; 315/308
(58) Field of Classification Search
USPC ......... 315/224, 250, 255, 256, 277, 291, 308, 315/312
See application file for complete search history.

(56) References Cited

U.S. PATENT DOCUMENTS

| 6,954,364 | B2 | 10/2005 | Min | |
|---|---|---|---|---|
| 2008/0211423 | A1* | 9/2008 | Shinmen et al. | 315/259 |
| 2009/0015177 | A1* | 1/2009 | Fukumoto | 315/294 |
| 2009/0302768 | A1* | 12/2009 | Hung et al. | 315/127 |
| 2012/0187866 | A1* | 7/2012 | Ho et al. | 315/297 |

* cited by examiner

*Primary Examiner* — Douglas W Owens
*Assistant Examiner* — Thai Pham
(74) *Attorney, Agent, or Firm* — Altis & Wispro Law Group, Inc.

(57) ABSTRACT

A multi-lamp driving system includes a power stage circuit, a pulse width modulation (PWM) controller, a plurality of transformer circuits, and an abnormal detection circuit. Each of the transformer circuits includes a first primary winding and a second primary winding connected in series and a first secondary winding and a second secondary winding respectively outputting AC power signals to drive at least one lamp. The abnormal detection circuit is connected to a junction of the first primary winding and the second primary winding of each of the transformer circuits, and determines if voltages of the junction of the first primary winding and the second primary winding of each of the transformer circuits are different to determine if the at least two lamps are normal. The abnormal detection circuit further generate control signals to control the PWM controller upon the condition that one of the at least two lamps are abnormal.

14 Claims, 4 Drawing Sheets

MULTI-LAMP DRIVING SYSTEM

BACKGROUND

1. Technical Field

The disclosure relates to backlight driving systems, and particularly to a multi-lamp driving system.

2. Description of Related Art

A plurality of cold cathode fluorescent lamps (CCFL) are usually used as a backlight of a liquid crystal display (LCD). In order to light the plurality of CCFLs, an inverter is needed to convert input power into alternating current (AC) power to provide suitable driving power. The inverter includes a plurality of transformers, each of which drives one or two CCFL. If primary windings of the plurality of transformers are connected in parallel, the plurality of the transformers need high leakage inductance to maintain current balance among the plurality of CCFLs. However, the plurality of transformers with high leakage inductance result in high temperature rise and large sizes.

If the primary windings of the plurality of transformers are connected in series, the plurality of transformers with low leakage inductance can maintain current balance among the plurality of CCFLs. However, in this structure, voltage to drive one CCFL and voltage to drive two CCFLs are different, which may result in that driving voltage is not sufficient to driving the plurality of CCFLs or the plurality of transformers are burnt due to the high driving voltage.

DETAILED DESCRIPTION

Figure 1:
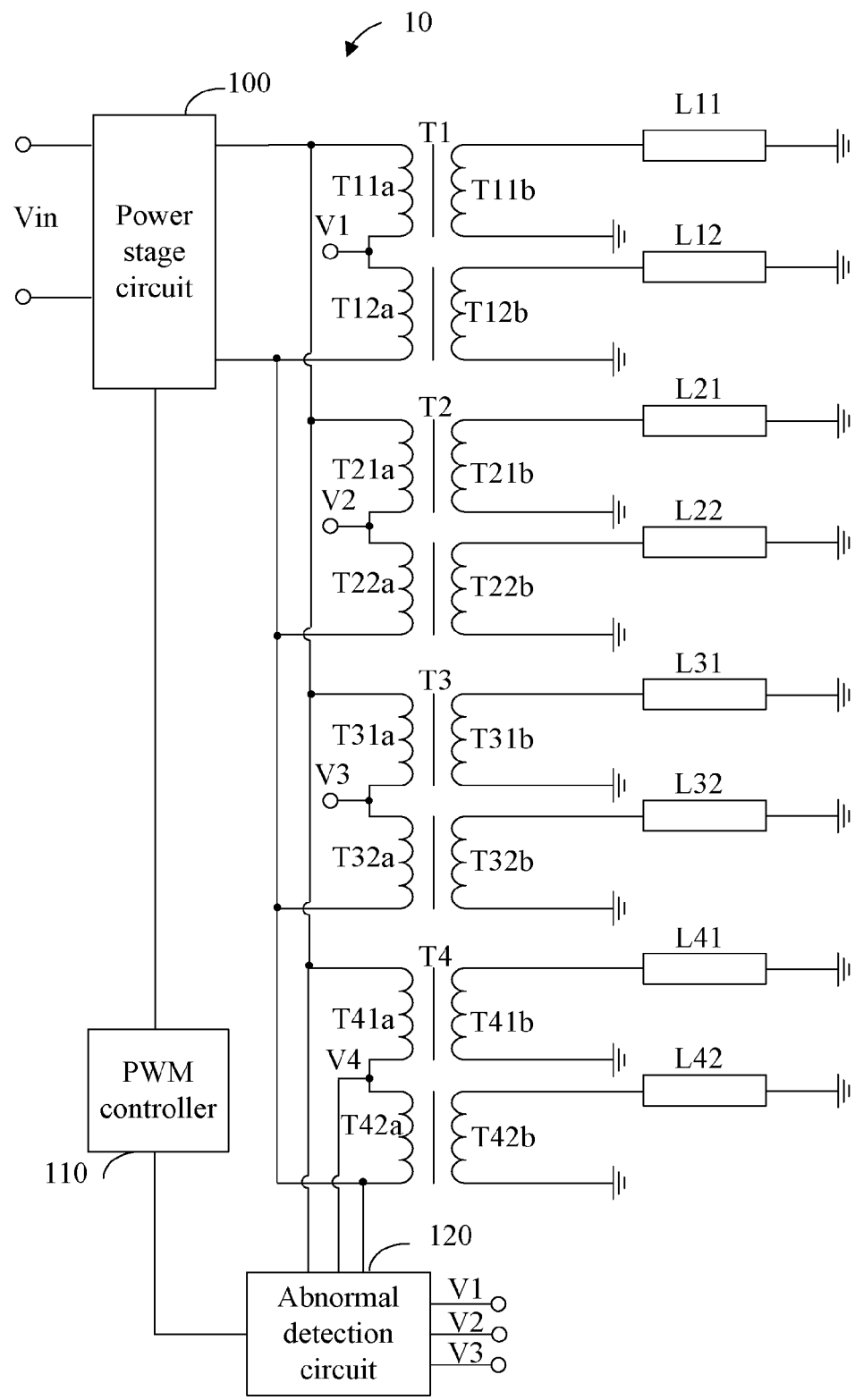
FIG. 1 is a schematic diagram of one embodiment of a multi-lamp driving system as disclosed.

FIG. 1 is a schematic diagram of one embodiment of a multi-lamp driving system 10 as disclosed. The multi-lamp driving system 10 converts input power Vin into alternating current (AC) power to drive a plurality of lamps (eight shown for example), and includes a power stage circuit 100, a pulse width modulation (PWM) controller 110, a plurality of transformer circuit T1, T2, T3, T4 (three shown for example), and an abnormal detection circuit 120. The power stage circuit 100 converts the input power Vin into first AC power signals. In one embodiment, the power stage circuit 100 may include a filter circuit to filter the input power Vin and a switch circuit to convert the filtered input power Vin into the first AC power signals. In one embodiment, the input power Vin may be direct current (DC) power. In alternative embodiments, the input power Vin may be AC power. The PWM controller 110 generates and outputs PWM signals to control the power stage circuit 100.

The plurality of transformer circuits T1, T2, T3, T4 are connected to the power stage circuit 100 in parallel, and respectively transform the first AC power signals into second AC power signals to driving at least two lamps. In one embodiment, the plurality of transformer circuits T1, T2, T3, T4 further boost the first AC power signals. In alternative embodiments, the plurality of transformer circuits T1, T2, T3, T4 may further buck the first AC power signals.

Each of the plurality of transformer circuits T1, T2, T3, T4 includes a first primary winding, a second primary winding, a first secondary winding, and a second secondary winding. That is, the transformer circuit T1 includes a first primary winding T11$a$, a first secondary winding T11$b$, a second primary winding T12$a$, and a second secondary winding T12$b$. The transformer circuit T2 includes a first primary winding T21$a$, a first secondary winding T21$b$, a second primary winding T22$a$, and a second secondary winding T22$b$. The transformer circuit T3 includes a first primary winding T31$a$, a first secondary winding T31$b$, a second primary winding T32$a$, and a second secondary winding T32$b$. The transformer circuit T4 includes a first primary winding T41$a$, a first secondary winding T41$b$, a second primary winding T42$a$, and a second secondary winding T42$b$. In one embodiment, the first primary winding and the second primary winding of each of the plurality of transformer circuits T1, T2, T3, T4 are respectively located on one magnetic element. In alternative embodiments, the first primary winding and the second primary winding of each of the plurality of transformer circuits T1, T2, T3, T4 are respectively located on two magnetic elements.

The first primary winding and the second primary winding of each of the plurality of transformer circuits T1, T2, T3, T4 are connected in series to receive the first AC power signals. The first secondary winding and the second secondary winding of each of the plurality of transformer circuits T1, T2, T3, T4 respectively output the second AC power signals to drive at least one lamp. In this embodiment, the first primary winding T11$a$ and the second primary winding T12$a$ of the transformer circuit T1 are connected in series to receive the first AC power signals, the first secondary winding T11$b$ outputs the second AC power signals to drive a lamp L11, and the second secondary winding T12$b$ outputs the second AC power signals to drive a lamp L12. The first primary winding T21$a$ and the second primary winding T22$a$ of the transformer circuit T2 are connected in series to receive the first AC power signals, the first secondary winding T21$b$ outputs the second AC power signals to drive a lamp L21, and the second secondary winding T22$b$ outputs the second AC power signals to drive a lamp L22, and so on.

In one embodiment, if the lamps L11, L12, L21, L22, L31, L32, L41, L42 are all lit, currents flowing through the lamps L11, L12, L21, L22, L31, L32, L41, L42 are same due to series connection of the first primary winding and the second primary winding of each of the plurality of transformer circuits T1, T2, T3, T4. Thus, voltages V1, V2, V3, V4 of junctions of the first primary winding and the second primary winding of each of the plurality of transformer circuits T1, T2, T3, T4 are the same (hereinafter junction voltage V1, V2, V3, V4). If the junction voltages V1, V2, V3, V4 are obviously different, such as, the difference greater than 1V, it indicates that at least one of the lamps L11, L12, L21, L22, L31, L32, L41, L42 is abnormal, such as, short or open.

The abnormal detection circuit 120 is connected to the junctions of the first primary winding and the second primary winding of the plurality of transformer circuit T1, T2, T3, T4, and detects and compares the junction voltage V1, V2, V3, V4. The abnormal detection circuit 120 further determines if the junction voltage V1, V2, V3, V4 are different to determine if the lamps L11, L12, L21, L22, L31, L32, L41, L42 are normal, and generates control signals to control the PWM controller 110 upon the condition that one of the lamps L11, L12, L21, L22, L31, L32, L41, L42 are abnormal. In one embodiment, the abnormal detection circuit 120 generates the control signals to control the PWM controller 110 to regulate duty cycles of the PWM signals upon the condition that one of the lamps L11, L12, L21, L22, L31, L32, L41, L42 is abnormal. In alternative embodiment, the abnormal detection circuit 120 generates the control signals to stop the PWM controller 110 from outputting the PWM signals upon the condition that one of the lamps L11, L12, L21, L22, L31, L32, L41, L42 is abnormal.

Thus, when the multi-lamp driving system 10 detects that the junction voltages V1, V2, V3, V4 are different, the multi-lamp driving system 10 determines one of the lamps L11, L12, L21, L22, L31, L32, L41, L42 is abnormal. Thus, the multi-lamp driving system 10 controls the PWM controller 110 to act correspondingly, to protect the transformer circuits T1, T2, T3, T4.

Figure 2:
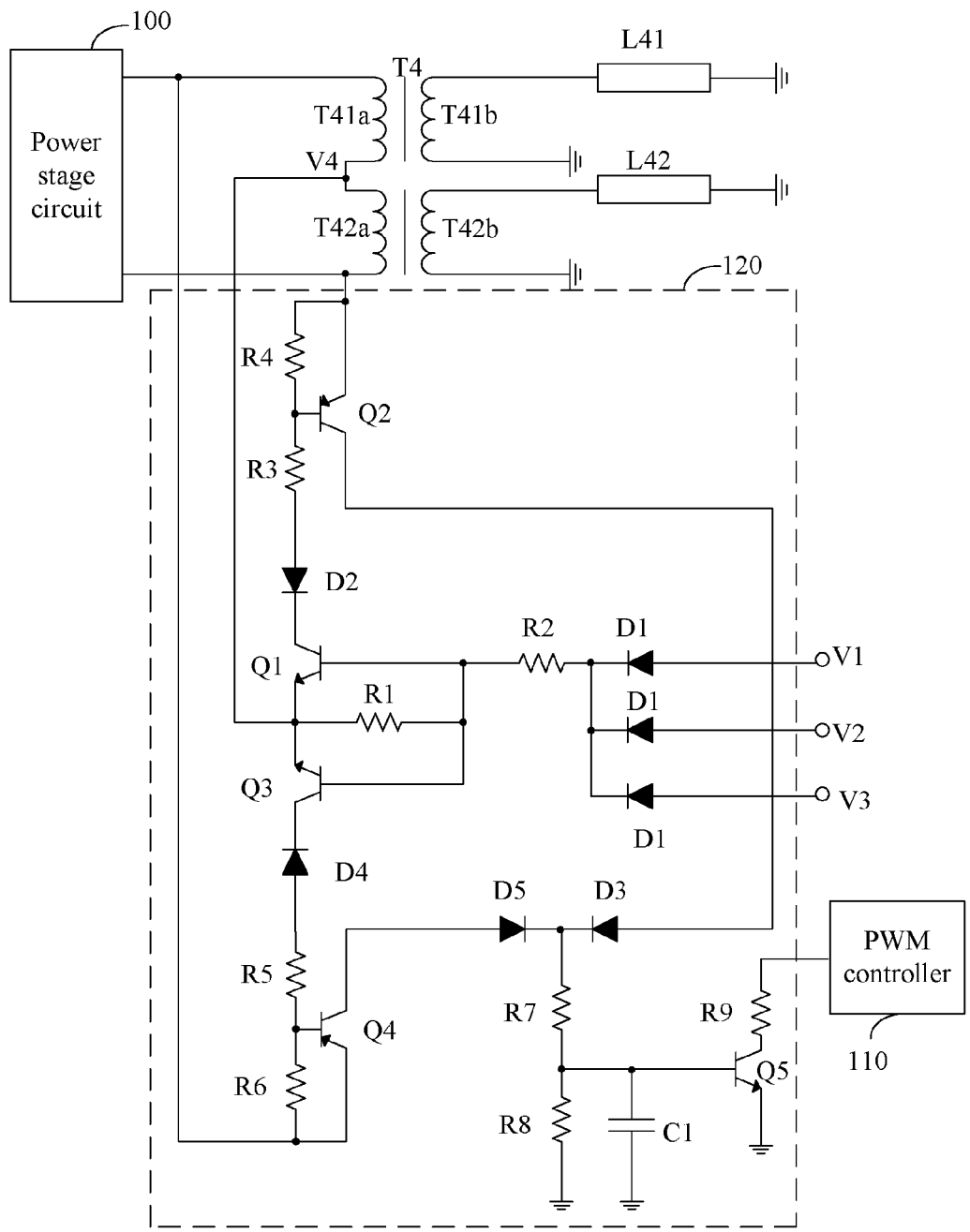
FIG. 2 is a circuit diagram of one embodiment of an abnormal detection circuit of a multi-lamp driving system as disclosed.

FIG. 2 is a circuit diagram of one embodiment of the abnormal detection circuit 120 of the multi-lamp driving system 10. The abnormal detection circuit 120 includes a plurality of first diodes D1, second to fifth diodes D2 to D5, first to fifth switches Q1 to Q5, first to ninth resistor R1 to R9 and a first capacitor C1. The first to fifth switches Q1 to Q5 all include a control pole, a first pole, and a second pole. The first pole of the first switch Q1 is connected to the junction of the first primary winding and the second primary winding of one of the plurality of transformer circuits T1, T2, T3, T4, such as, the junction of the first primary winding and the second primary winding of the transformer circuit T4, and is connected to the control pole of the first switch Q1 via the first resistor R1.

Numbers of the plurality of first diodes D1 are one less than numbers of the plurality of transformer circuits T1, T2, T3, T4. An anode of each of the plurality of first diodes D1 is connected to the junction of the first primary winding and the second primary winding of a corresponding one of others of the plurality of transformer circuits T1, T2, T3, T4, such as, the junctions of the first primary winding and the second primary winding of the transformer circuits T1, T2, T3. Cathodes of the plurality of first diodes D1 are connected together to connected to the control pole of the first switch Q1 via the second resistor R2. In one embodiment, the first switch Q1 and the plurality of first diodes D1 are configured to compare if the junction voltages V1, V2, V3, V4 are different.

A cathode of the second diode D2 is connected to the second pole of the first switch Q1, and an anode of the second diode D2 is connected to a negative terminal of the second primary winding of one of the plurality of transformer circuits T1, T2, T3, T4 via the third resistor R3 and the fourth resistor R4 connected in series. In this embodiment, the anode of the second diode D2 is connected to a negative terminal of the second primary winding T42a of the transformer circuit T4, that is, a terminal not connected to the first primary winding T41a of the transformer circuit T4. The control pole of the second switch Q2 is connected between the third resistor R3 and the fourth resistor R4, the first pole of the second switch Q2 is connected to the negative terminal of the second primary winding of the one of the plurality of transformer circuits together with the fourth resistor R4, and the second pole of the second switch Q2 is connected to an anode of the third diode D3. A cathode of the third diode D3 is grounded via the seventh resistor R7 and the eighth resistor R8 connected in series.

The control pole of the third switch Q3 is connected to the cathodes of the plurality of first diodes D1 via the second resistor R2, and is connected to the first pole of the third switch Q3 via the first resistor R1. The first pole of the third switch Q3 is connected to the first pole of the first switch Q1. A cathode of the fourth diode D4 is connected to the second pole of the third switch Q3, and an anode of the fourth diode D4 is connected to a positive terminal of the first primary winding of one of the plurality of transformer circuits T1, T2, T3, T4 via the fifth resistor R5 and the sixth resistor R6 connected in series. In one embodiment, the anode of the fourth diode D4 is connected to the positive terminal of the first primary winding T41a of the transformer circuit T4.

The control pole of the fourth switch Q4 is connected between the fifth resistor R5 and the sixth resistor R6, and the first pole of the fourth switch Q4 is connected to the positive terminal of the first primary winding of the one of the plurality of transformer circuits together with the sixth resistor R6, that is, the positive terminal of the first primary winding T41a of the transformer circuit T4. The second pole of the fourth switch Q4 is connected to an anode of the fifth diode D5, and a cathode of the fifth diode D5 is connected to the cathode of the third diode D3. The first capacitor C1 is connected to the eighth resistor R8 in parallel. The control pole of the fifth switch Q5 is connected between the seventh resistor R7 and the eighth resistor R8, the first pole of the fifth switch Q5 is grounded, and the second pole of the fifth switch Q5 is connected to the PWM controller 110 via the ninth resistor R9.

In one embodiment, the first switch Q1, the third switch Q3, and the fifth switch Q5 are NPN type transistors. The control poles of the first switch Q1, the third switch Q3, and the fifth switch Q5 are bases of the NPN type transistors, the first pole of the first switch Q1, the third switch Q3, and the fifth switch Q5 are emitters of the NPN type transistors, and the second pole of the first switch Q1, the third switch Q3, and the fifth switch Q5 are collectors of the NPN type transistors. The second switch Q2 and the fourth switch Q4 are PNP type transistors, the control poles of the second switch Q2 and the fourth switch Q4 are bases of the PNP type transistors, the first poles of the second switch Q2 and the fourth switch Q4 are emitters of the PNP type transistors, and the second poles of the second switch Q2 and the fourth switch Q4 are collectors of the PNP type transistors In one embodiment, the power stage circuits 100 outputs the first AC power signals, so the positive terminals of the first primary windings and the negative terminals of the second primary windings of the plurality of transformer circuits T1, T2, T3, T4 alternately receive positive voltage first AC signals. A first circuit including the first switch Q1, the second diode D2, the second switch Q2, the third diode D3, the third resistor R3, and the fourth resistor R4 has same structure and connection as a second circuit including the third switch Q3, the fourth diode D4, the fourth switch Q4, the fifth diode D5, the fifth resistor R5, and the sixth resistor R6. The first circuit works when the negative terminals of the second primary windings of the plurality of transformer circuits T1, T2, T3, T4 receive the positive voltage first AC signal, and the second circuit works when the positive terminals of the first primary windings of the plurality of transformer circuits T1, T2, T3, T4 receive the positive voltage first AC signals. Thus, no matter which lamps L11, L12, L21, L22, L31, L32, L41, L42 are abnormal, the abnormal detection circuit 120 can detect.

If the lamps L11, L12, L21, L22, L31, L32, L41, L42 are normal, the junction voltages V1, V2, V3, V4 are nearly the same. Therefore, the first switch Q1 and the third switch Q3 are off. There is no current flowing through the second diode D2 and the fourth diode D4, so the second switch Q2, the fourth switch Q4, the third diode D3, and the fifth diode D5 are all off. Thus, the fifth switch Q5 is off, and the abnormal detection circuit 120 outputs a high logic level signal to the PWM controller 110.

If one of the lamps L11, L12, L21, L22, L31, L32, L41, L42 is abnormal, the junction voltage corresponding to the abnormal lamp is different from other junction voltages V1, V2, V3, V4. The plurality of first diodes D1 retrieve a greatest junction voltage from the junction voltages V1, V2, V3, and output the greatest junction voltage to the control poles of the first switch Q1 and the third switch Q3 via the second resistor R2. Then the greatest junction voltage is compared with the junction voltage V4 by the first switch Q1 and the third switch Q3, the first switch Q1 or the third switch Q3 is turned on. Supposing that the first switch Q1 is turned on, current flows through the second diode D2. Voltage at the negative terminal of the second primary winding T42a of the transformer circuit T4 is input to the control pole of the second switch Q2 via the fourth resistor R4, so voltage at the control pole of the second switch Q2 is less than the first pole of the second switch Q2. Therefore, the second switch Q2 and the third diode D3 are turned on, which results in that the fifth switch Q5 is turned on. Therefore, the abnormal detection circuit 120 outputs a low logic level signal to the PWM controller 110. Then, the PWM controller 110 receives the low logic level signal, and regulates the duty cycles of the PWM signals or stop outputting the PWM signals to protect the plurality of transformer circuits T1, T2, T3, T4.

Figure 3:
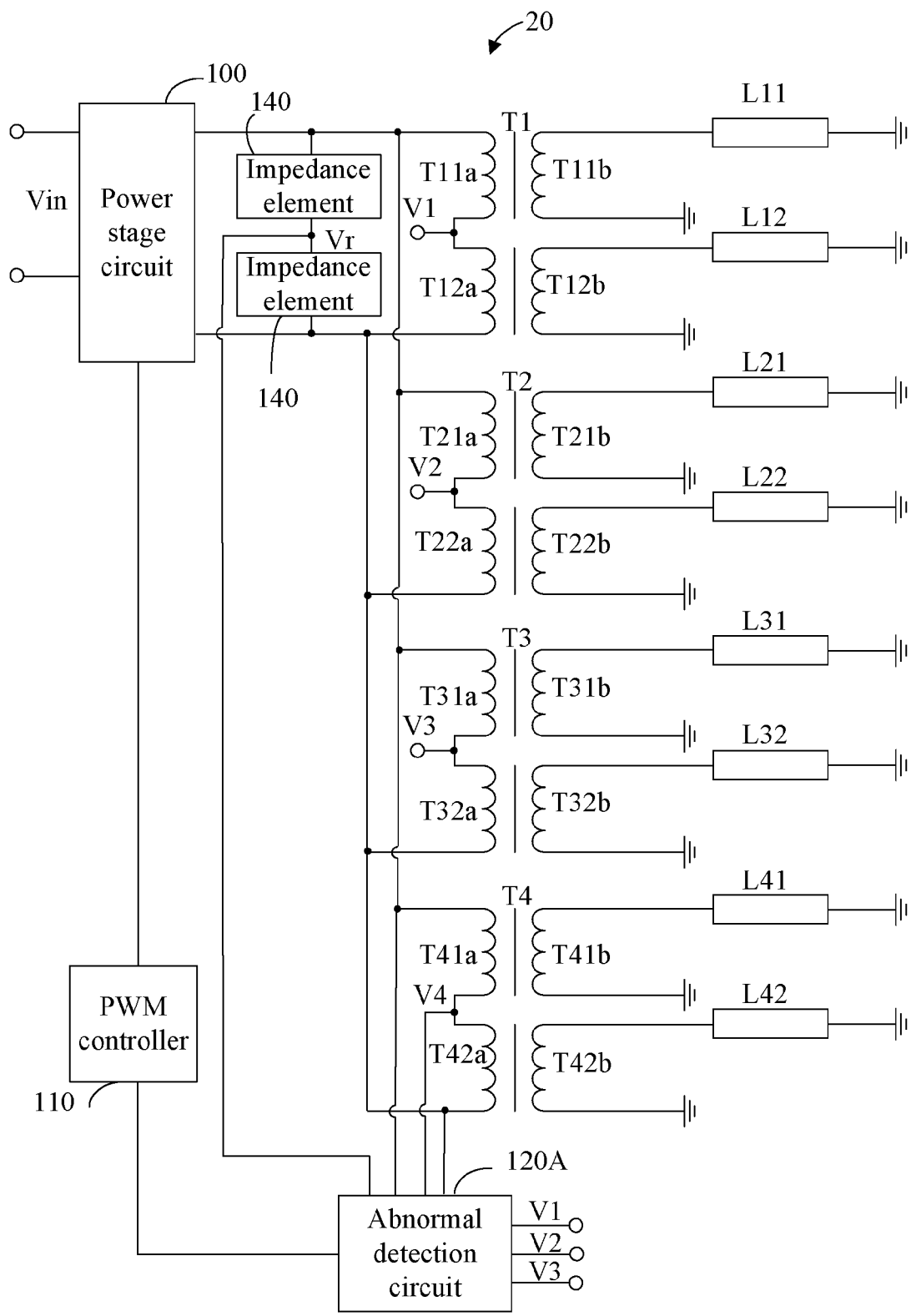
FIG. 3 is a schematic diagram of another embodiment of a multi-lamp driving system as disclosed.

FIG. 3 is a schematic diagram of another embodiment of a multi-lamp driving system 20 as disclosed. The difference between the multi-lamp driving system 20 and the multi-lamp driving system 10 is that the multi-lamp driving system 10 further includes two impedance elements 140. The two impedance elements 140 are connected in series to form an impedance circuit, which is connected in parallel with the plurality of transformer circuits T1, T2, T3, T4. In one embodiment, the impedance elements 140 are resistors. The abnormal detection circuit 120A retrieves voltage Vr of a junction of the two impedance elements 140 as reference voltage, and compares the voltage Vr with the junction voltage V1, V2, V3, V4 to determine if the lamps L11, L12, L21, L22, L31, L32, L41, L42 are normal. Other components of the multi-lamp driving system 20 are similar to those of the multi-lamp driving system 10, therefore, descriptions are omitted here.

Figure 4:
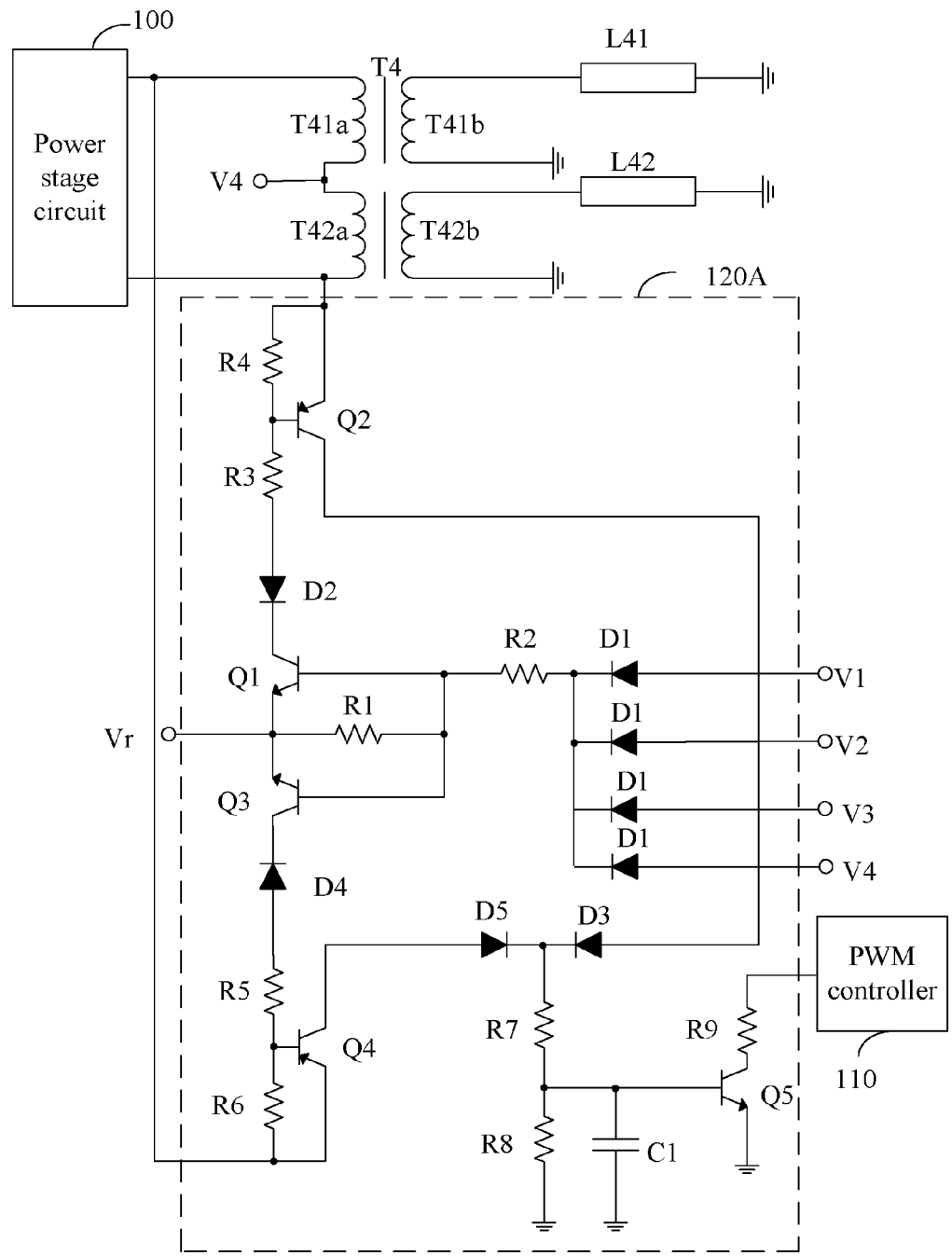
FIG. 4 is a circuit diagram of another embodiment of an abnormal detection circuit of a multi-lamp driving system as disclosed.

FIG. 4 is a circuit diagram of another embodiment of the abnormal detection circuit 120A of the multi-lamp driving system 20. The abnormal detection circuit 120A is similar to the abnormal detection circuit 120 of FIG. 2 except that the first poles of the first switch Q1 and the third switch Q3 are connected to the junction of the impedance elements 140 and the anode of each of the plurality of first diodes D1 is connected to the junction of the first primary winding and the second primary winding of a corresponding one of the plurality of transformer circuits T1, T2, T3, T4. In one embodiment, the numbers of the plurality of first diodes D1 are the same as the umbers the plurality of transformer circuits T1, T2, T3, T4. Working principle of the abnormal detection circuit 120A is the same as that of the abnormal detection circuit 120, therefore, descriptions are omitted here.

The multi-lamp driving systems 10, 20 detect if the junction voltages V1, V2, V3, V4 of the first primary windings and the second primary windings of the plurality of transformer circuits T1, T2, T3, T4 are different, to determine if the lamps L11, L12, L21, L22, L31, L32, L41, L42 are abnormal, which can effectively detect the abnormality and avoid damage of the transformer circuits T1, T2, T3, T4.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A multi-lamp driving system, comprising:
    a power stage circuit, to convert an input power supply into first alternating current (AC) power signals;
    a plurality of transformer circuits, connected to the power stage circuit in parallel, to respectively transform the first AC power signals into second AC power signals to drive at least two lamps, each of the plurality of transformer circuits comprising a first primary winding, a second primary winding, a first secondary winding, and a second secondary winding, the first primary winding connected to the second primary winding in series to receive the first AC power signals, and the first secondary winding and the second secondary winding respectively outputting the second AC power signals to drive at least one lamp;
    an abnormal detection circuit, connected to a junction of the first primary winding and the second primary winding of each of the plurality of transformer circuits, to determine if voltages of the junction of the first primary winding and the second primary winding of each of the plurality of transformer circuits are different to determine if the at least two lamps are normal, and to generate control signals upon the condition that one of the at least two lamps is short or open; and
    a pulse width modulation (PWM) controller, to output PWM signals based on the control signals to control the power stage circuit.

2. The multi-lamp driving system of claim 1, wherein the abnormal detection circuit generates the control signals to regulate duty cycles of the PWM signals upon the condition that the at least two lamps are short or open.

3. The multi-lamp driving system of claim 1, wherein the abnormal detection circuit generates the control signals to stop the PWM controller from outputting the PWM signals upon the condition that the at least two lamps are short or open.

4. The multi-lamp driving system of claim 1, wherein the abnormal detection circuit comprises:
    a first switch, comprising a control pole, a first pole, and a second pole, the first pole connected to the junction of the first primary winding and the second primary winding of one of the plurality of transformer circuits and connected to the control pole via a first resistor;
    a plurality of first diodes, wherein numbers of the plurality of first diodes are one less than numbers of the plurality of transformer circuits, an anode of each of the plurality of first diodes is connected to a junction of the first primary winding and the second primary winding of a corresponding one of others of the plurality of transformer circuits, and cathodes of the plurality of first diodes are connected together to be connected to the control pole of the first switch via a second resistor;
    a second diode, with a cathode connected to the second pole of the first switch and an anode connected to a negative terminal of the second primary winding of one of the plurality of transformer circuits via a third resistor and a fourth resistor connected in series;
    a second switch, comprising a control pole, a first pole, and a second pole, the control pole of the second switch connected between the third resistor and the fourth resistor, and the first pole of the second switch connected to the negative terminal of the second primary winding of the one of the plurality of transformer circuits together with the fourth resistor;

a third diode, with an anode connected to the second pole of the second switch;

a third switch, comprising a control pole, a first pole, and a second pole, the control pole of the third switch connected to the first pole of the third switch via the first resistor and connected to the cathodes of the plurality of first diodes via the second resistor, and the first pole of the third switch connected to the first pole of the first switch;

a fourth diode, with a cathode connected to the second pole of the third switch and an anode connected to a positive terminal of the first primary winding of one of the plurality of transformer circuits via a fifth resistor and a sixth resistor;

a fourth switch, comprising a control pole, a first pole, and a second pole, the control pole of the fourth switch connected between the fifth resistor and the sixth resistor, and the first pole of the fourth switch connected to the positive terminal of the first primary winding of the one of the plurality of transformer circuits together with the sixth resistor;

a fifth diode, with an anode connected to the second pole of the fourth switch and a cathode connected to the cathode of third diode and grounded via a seventh resistor and an eighth resistor connected in series;

a first capacitor, connected to the eighth resistor in parallel; and a fifth switch, comprising a control pole, a first pole, and a second pole, the control pole of the fifth switch connected between the seventh resistor and the eighth resistor, the first pole of the fifth switch grounded, and the second pole of the fifth switch connected to the PWM controller via a ninth resistor.

5. The multi-lamp driving system of claim 4, wherein the first switch, the third switch, and the fifth switch are NPN type transistors, the control poles of the first switch, the third switch, and the fifth switch are bases of the NPN type transistors, the first poles of the first switch, the third switch, and the fifth switch are emitters of the NPN type transistors, and the second poles of the first switch, the third switch, and the fifth switch are collectors of the NPN type transistors.

6. The multi-lamp driving system of claim 4, wherein the second switch and the fourth switch are PNP type transistors, the control poles of the second switch and the fourth switch are bases of the PNP type transistors, the first poles of the second switch and the fourth switch are emitters of the PNP type transistors, and the second poles of the second switch and the fourth switch are collectors of the PNP type transistors.

7. The multi-lamp driving system of claim 1, further comprising two impedance elements connected in series to form an impedance circuit connected in parallel with the plurality of transformer circuits.

8. The multi-lamp driving system of claim 7, wherein the impedance elements are resistors.

9. The multi-lamp driving system of claim 7, wherein the abnormal detection circuit comprises:

a plurality of sixth diodes, wherein numbers of the plurality of sixth diodes are the same as numbers of the plurality of transformer circuits, an anode of each of the plurality of first diodes is connected to a junction of the first primary winding and the second primary winding of a corresponding one of the plurality of transformer circuits, and cathodes of the plurality of first diodes are connected together;

a sixth switch, comprising a control pole, a first pole, and a second pole, the control pole connected to cathodes of the plurality of sixth diodes via a tenth resistor, the first pole connected to a junction of the two impedance elements and connected to the control pole via an eleventh resistor;

a seventh diode, with a cathode connected to the second pole of the sixth switch and an anode connected to a negative terminal of the second primary winding of one of the plurality of transformer circuits via a twelfth resistor and a thirteenth resistor connected in series;

a seventh switch, comprising a control pole, a first pole, and a second pole, the control pole of the seventh switch connected between the twelfth resistor and the thirteenth resistor, and the first pole of the seventh switch connected to the negative terminal of the second primary winding of the one of the plurality of transformer circuits together with the thirteenth resistor;

an eighth diode, with an anode connected to the second pole of the seventh switch;

an eighth switch, comprising a control pole, a first pole, and a second pole, the control pole of the eighth switch connected to the first pole of the eighth switch via the eleventh resistor and connected to the cathodes of the plurality of sixth diodes via the tenth resistor, and the first pole of the eighth switch connected to the first pole of the sixth switch;

a ninth diode, with a cathode connected to the second pole of the eighth switch and an anode connected to a positive terminal of the first primary winding of one of the plurality of transformer circuits via a fourteenth resistor and a fifteenth resistor;

a ninth switch, comprising a control pole, a first pole, and a second pole, the control pole of the ninth switch connected between the fourteenth resistor and the fifteenth resistor, and the first pole of the ninth switch connected to the positive terminal of the first primary winding of the one of the plurality of transformer circuits together with the fifteenth resistor;

a tenth diode, with an anode connected to the second pole of the ninth switch and a cathode connected to the cathode of the eighth diode and grounded via a sixteenth resistor and a seventeenth resistor connected in series;

a second capacitor, connected to the seventeenth resistor in parallel; and a tenth switch, comprising a control pole, a first pole, and a second pole, the control pole of the tenth switch connected between the sixteenth resistor and the seventeenth resistor, the first pole of the tenth switch grounded, and the second pole of the tenth switch connected to the PWM controller via an eighteenth resistor.

10. The multi-lamp driving system of claim 9, wherein the sixth switch, the eighth switch, and the tenth switch are NPN type transistors, the control poles of the sixth switch, the eighth switch, and the tenth switch are bases of the NPN type transistors, the first poles of the sixth switch, the eighth switch, and the tenth switch are emitters of the NPN type transistors, and the second poles of the sixth switch, the eighth switch, and the tenth switch are collectors of the NPN type transistors.

11. The multi-lamp driving system of claim 9, wherein the seventh switch and the ninth switch are PNP type transistors, the control poles of the seventh switch and the ninth switch are bases of the PNP type transistors, the first poles of the seventh switch and the ninth switch are emitters of the PNP type transistors, and the second poles of the seventh switch and the ninth switch are collectors of the PNP type transistors.

12. A multi-lamp driving system, comprising a power stage circuit and a pulse width modulation (PWM) controller, the multi-lamp driving system further comprising:
- a plurality of transformer circuits, connected to the power stage circuit in parallel, each of the plurality of transformer circuits comprising a first primary winding, a second primary winding, a first secondary winding, and a second secondary winding, the first primary winding connected to the second primary winding in series, and the first secondary winding and the second secondary winding respectively outputting the AC power signals to drive at least one lamp; and
- an abnormal detection circuit, connected to junctions of the first primary winding and the second primary winding of the plurality of transformer circuits, to detect and compare voltages of the junction of the first primary winding and the second primary winding of each of the plurality of transformer circuits, and to generate control signals to control the PWM controller upon the condition that the voltages of the junction of the first primary winding and the second primary winding of each of the plurality of transformer circuits are obviously different.

13. The multi-lamp driving system of claim 12, wherein the abnormal detection circuit generates the control signals to control the PWM controller to regulate duty cycles of PWM signals generated by the PWM controller upon the condition that the voltages of the junction of the first primary winding and the second primary winding of each of the plurality of transformer circuits are different.

14. The multi-lamp driving system of claim 12, wherein the abnormal detection circuit generates the control signals to stop the PWM controller from outputting PWM signals upon the condition that the voltages of the junction of the first primary winding and the second primary winding of each of the plurality of transformer circuits are different.

* * * * *